(12) United States Patent
Hoover, Jr. et al.

(10) Patent No.: US 8,017,662 B2
(45) Date of Patent: Sep. 13, 2011

(54) METHOD OF SEPARATION AND CLEANING OF POST CONSUMER CARPET FACE YARN FROM CARPET BACKING AND YARN PRODUCT PRODUCED THEREFROM

(75) Inventors: George Taylor Hoover, Jr., Bristol, VA (US); Milton Keith Roark, Bristol, VA (US); Brendan Francis McSheehy, Jr., Abingdon, VA (US); Matthew Benjamin Studholme, Abingdon, VA (US)

(73) Assignee: Universal Fibers, Inc., Bristol, VA (US)

( * ) Notice: Subject to any disclaimer, the term of this patent is extended or adjusted under 35 U.S.C. 154(b) by 100 days.

(21) Appl. No.: 12/155,117

(22) Filed: May 29, 2008

(65) Prior Publication Data

US 2009/0082476 A1  Mar. 26, 2009

Related U.S. Application Data

(60) Provisional application No. 60/960,211, filed on Sep. 20, 2007.

(51) Int. Cl.
*C08J 11/04* (2006.01)

(52) U.S. Cl. ........... 521/49.8; 521/40; 521/49; 528/310; 156/72; 156/94; 8/924; 8/930; 8/931; 264/172.11; 264/172.17; 264/172.18; 428/373; 428/395

(58) Field of Classification Search ............ 521/40, 521/40.5, 42, 44, 45, 43.5, 48, 49.5, 49.8; 528/272, 288, 291, 292, 310, 328, 335, 338; 156/94, 60, 72; 57/228; 8/149.2, 539, 929, 8/924, 930, 931; 264/172.11, 172.17, 172.18, 264/210.8; 428/85, 96, 97, 95, 92, 357, 364, 428/373, 370, 395

See application file for complete search history.

(56) References Cited

U.S. PATENT DOCUMENTS

| 5,169,870 A | 12/1992 | Corbin et al. |
|---|---|---|
| 5,230,473 A | 7/1993 | Hagguist et al. |
| 5,233,021 A | 8/1993 | Sikorski |
| 5,468,900 A | 11/1995 | Moran et al. |
| 5,518,188 A | 5/1996 | Sharer |
| 5,526,694 A | 6/1996 | McEachern et al. |
| 5,535,945 A | 7/1996 | Sferrazza et al. |
| 5,565,158 A | 10/1996 | Sullivan et al. |
| 5,598,980 A | 2/1997 | Dilly-Louis et al. |
| 5,626,939 A | 5/1997 | Kotlair et al. |
| 5,668,277 A | 9/1997 | Hendrix et al. |
| 5,719,198 A | 2/1998 | Young et al. |
| 5,722,603 A | 3/1998 | Costello et al. |
| 5,728,741 A | 3/1998 | Zegler et al. |
| 6,059,207 A | 5/2000 | Costello et al. |
| 6,752,336 B1 | 6/2004 | Wingard |
| 2002/0123576 A1* | 9/2002 | Studholme et al. ............ 525/419 |
| 2004/0235970 A1* | 11/2004 | Smith et al. .................. 521/46.5 |
| 2005/0272913 A1 | 12/2005 | Mauldin et al. |
| 2006/0031997 A1 | 2/2006 | Berard et al. |

FOREIGN PATENT DOCUMENTS

| DE | 19542666 A1 | 5/1996 |
|---|---|---|
| EP | 0087133 A2 | 8/1983 |
| EP | 0984087 A1 | 3/2000 |
| JP | 60206868 | 10/1985 |
| JP | 5287139 | 11/1993 |
| JP | 5293828 | 11/1993 |
| WO | 0131096 A1 | 5/2001 |

OTHER PUBLICATIONS

English Abstract of JP60206868.
English Abstract of JP5287139.
English Abstract of JP5293828.
European Search Report dated Jun. 1, 2011 for EP Application No. 08 252 165.9 (42932-EP).
Tristan Roberts "Interface to Recycle Nylon Carpet Fiber into Fiber", Greensource, Aug. 20, 2007, retrieved from the Internet at URL: http://greensource.construction.com/news/070820RecycledCarpet. asp (retrieved Jan. 21, 2011).
Wustenberg D. et al., "Material Recycling of Textile Floor Coverings," Int'l Polym. Sci. and Tech. (1994), vol. 21, No. 3, pp. Tl-T9.

* cited by examiner

*Primary Examiner* — Ling Choi
*Assistant Examiner* — Frances Tischler
(74) *Attorney, Agent, or Firm* — Hovey Williams LLP

(57) ABSTRACT

A process for producing a synthetic fiber composition with reclaimed post consumer carpet yarn, wherein face yarn is shaved from post consumer carpet using a shaving device to provide shaved face yarn, the shaved face yarn is reduced in size, contaminants are removed using mechanical screeners, the shave face yarn is melt filtered, and then fiber spun.

20 Claims, No Drawings

METHOD OF SEPARATION AND CLEANING OF POST CONSUMER CARPET FACE YARN FROM CARPET BACKING AND YARN PRODUCT PRODUCED THEREFROM

CROSS-REFERENCE TO RELATED APPLICATION

The present application is based on U.S. Provisional Application Ser. No. 60/960,211, filed Sep. 20, 2007, the priority of which is hereby claimed.

BACKGROUND OF THE INVENTION

1. Field of the Invention

This invention relates to a process for reclaiming and recycling post consumer carpet. More specifically, it relates to a process for reclaiming and recycling the face yarn of post consumer carpet. The reclaimed and recycled face yarn may be used to produce further yarn for both textile and floorcovering applications. The reclaimed and recycled face yarn may also be used to produce articles for other non-yarn related applications such as injection molded articles.

2. The Prior Art

Over the last two decades, carpets for domestic and for institutional use have been increasingly made from synthetic polymeric materials, and a major problem has arisen with respect to disposal of such floorcoverings when they reach the end of their useful life. Disposal of such wastes can be achieved in several ways. Two ways are either by burying in a landfill site or by burning in an incinerator facility. In the United States an estimated 5 billion pounds of carpet waste is dumped into landfills. Landfill sites are becoming increasingly scarce and expensive to use. Recent research has also suggested that landfill sites, located conveniently close to urban areas, are implicated in health problems within local populations. Incineration of waste is also the subject of much environmental disapproval, both by the public and in some scientific circles. Also, the energy recovered from incineration of waste plastics is low, particularly in terms of the volume of such scrap.

Most of the components that make up carpet are potentially recyclable or reusable. Thus, an alternative option to dumping in landfills or incineration, and the most favored option for dealing with waste plastics, is the recycling of these into other materials and/or products. However, this is not a simple option as might be first envisaged. Despite the public perception of "plastic" as being a single term to describe materials which are virtually identical, it is well known in the art that this is not the case, and that different types of plastics do not easily combine together to form a coherent single material. Reprocessing of mixed plastics waste streams, with no sorting of types, or addition of other materials, invariably results in materials of low end value. In many cases the cost of the equipment involved, and the energy expended, cannot be recouped in selling on the product. In order to produce materials of value to the industry from recycled materials, a great deal of expertise has to be applied, and particular waste streams, of known and consistent content, must be available.

Modern carpets generally consist of three major components. Firstly, there is the face yarn, which may be of many different fiber types or mixtures thereof. Secondly, there is a primary backing (to which the yarn is fixed, or into which it is woven), which is most commonly a woven or nonwoven fabric of a polyester or a polyolefin. Thirdly, there is a secondary backing layer. The secondary backing tends to form the majority of the weight of the construct and is typically laminated to the tufted carpet. The secondary backing may be a sheet or foamed material, often containing a high level of coarse particle inorganic mineral fillers. Examples of base materials for the secondary backing are polyolefins, polyurethanes, PVC, bitumen and latex.

Various attempts have been made to recycle carpet scrap without prior separation of the components. JP 60 206 868, to Ikeda Bussan, describes pulverizing the waste carpet, mixing with ethylene-vinyl acetate in approximately 50:50 ratio, and calendaring to form a backing sheet for carpet use. The calendaring is carried out at low temperatures, such that the fiber component does not melt, but is instead merely dispersed through the product. U.S. Pat. No. 5,728,741 to Collins and Aikman claims a similar approach, although in this case the scrap is extruded at high temperature, prior to calendaring, so that all components are molten and are mixed in the melt state. Other patents refer to the recycling of unseparated carpet scrap, but using maleated polyolefins and/or ethylene-vinyl acetate as compatibilizers. See, for example, JP 05 287 139 to Teijin; JP 05 293 828 to Toyota/Mitsubishi; and U.S. Pat. No. 5,719,198 to Lear Corporation. U.S. Pat. No. 5,626,939 to Georgia Tech. takes a low energy approach by mixing well shredded carpet scrap with thermosetting resin precursors, and forming and crosslinking the result mixes into "synthetic wood." None of the above processes results in a melt spinnable product suitable for making fibers or yarns.

Other inventors have sought to separate the components of scrap carpets prior to recycling same as separate product streams. These mainly involve the chopping, shredding, and granulation of the carpet, followed by separation of the various polymer components via cyclone, hydrocyclone, or varying density liquid flotation baths. See, for example, U.S. Pat. No. 5,230,473 to Hagguist and Hume; U.S. Pat. No. 5,518,188 to JPS Automotive; U.S. Pat. No. 5,535,945 to BASF Corporation; U.S. Pat. No. 5,598,980 to Zimmer A. G.; and U.S. Pat. No. 5,722,603 to AlliedSignal/DSM. Dissolution methods have also been suggested; e.g., U.S. Pat. No. 5,233,021 to Georgia Tech. describes the use of a supercritical fluid approach, in which variation of temperature and pressure is used to sequentially dissolve the various components of the scrap carpet. Another alternative approach, used for carpets containing nylon 6, is the direct recovery of caprolactam from the carpet scrap, as described in U.S. Pat. No. 5,169,870 to BASF corporation, and U.S. Pat. No. 5,668,277 to DSM. Similar efforts have been made for monomer recovery from nylon 66 and mixtures of nylons, for example, U.S. Pat. No. 5,526,694 and U.S. Pat. No. 5,468,900 to E.I. DuPont de Nemours and Company. The recovered monomers from these processes can then be repolymerized to produce polymers for further fiber spinning. The above separation processes are complex in many cases, involving a number of stages, and obviously require expenditure of funds in their implementation. It may also be noted that, in many of these approaches, only one useable product is obtained from the separation process, and there still remains the problem of disposing of the other residues from the production process.

Analysis of post consumer carpet face yarn has indicated that a variety of contaminants may be present depending upon the exposure of the carpet during its lifetime. Undesirable contaminants that may need to be removed so that the reclaimed face yarn can be reused in a fiber spinning process include but are not limited to, sand, cellulose (for example in the form of wood or paper), latex, rubber, carpet backing materials, gypsum and other construction materials. Other possible contaminants include animal hair from pets, humans and textile fabrics, and vegetable matter. All of these contaminants are typically solids of very large "particle" sizes in comparison to the size of individual carpet yarn filaments. These contaminants need to be removed before the reclaimed material is suitable for fiber spinning, particularly those contaminants that do not melt at the fiber extrusion temperatures of the polymer being recycled, or are incompatible with the polymer being recycled. Melt extrusion fiber spinning methods typically incorporate fine filtration as part of the process so that large particle contaminants are excluded from the formed fibers. The presence of large particle contaminants reduces the strength of the formed fibers, making them unsuitable for most carpet or textile applications. In addition, high levels of contaminants, particularly of large particle size, result in short extruder filter life such that the fiber spinning process is uneconomical due to the need for very frequent filter screen changes.

Prior to this invention there has been no method suitable for reclaiming and reuse of carpet face yarn suitable for using in a melt extrusion fiber spinning to produce carpet or textile yarns without use of the undesirable depolymerization and repolymerization methods.

Methods have been discovered of producing post consumer carpet yarn reclaim of sufficient cleanliness that the reclaimed product can then be economically used for further carpet yarn production without detrimental loss of physical properties of the yarn produced.

DETAILED DESCRIPTION OF THE INVENTION

The method of the invention consists initially of identification of the chemical nature of the face yarn. The face yarn may be of several different types including but not limited to, polypropylene, polyester, e.g., polyethylene terephthalate and polytrimethylene terephthalate, polylactic acid, polyamide, e.g., nylon 6 and nylon 66, or natural fibers such as wool.

Samples can be taken and analyzed using various analytical laboratory techniques including both wet chemical methods and instrumental techniques. More preferably, a portable or hand-held identification device is used and most preferably, a near infrared (NIR) spectrometer is used that is specifically designed for the identification of plastic scrap in the field.

Once the face yarn type has been identified and sorted by chemical nature such that the type is predominantly of one type, the next step is separating the face yarn from the carpet backing such that the separated face yarn contains less than 5% backing material and preferably less than 2% backing material. The separated face yarn most preferably contains less than 0.5% backing material. This separation can be achieved by a shaving, splitting or shearing process that can shave off the face yarn without removing a significant amount of the carpet backing material along with the face yarn. Commercially available carpet shearing machines could be used for this purpose or potentially appropriately modified for optimum use. Modification of other carpet processing equipment could also be used for this purpose that includes, but is not limited to, splitting equipment that used in face-to-face weaving or fusion bonding (Ref: "Carpet Manufacture", G. H. Crawshaw, Chaucer Press Ltd, 2002). An alternative and preferred method is the use of a hide splitting machine commonly used in the hide tanning industry for splitting of natural or synthetic hides to a desired thickness. A hide splitting machine typically consists of two mutually opposing rollers. The hide is passed through these two rollers and is forwarded to a splitting blade arranged in the area comprised between the two rollers. The position of the rollers relative to the splitting blade can be modified to attain a certain thickness of hide. The pile height of the carpet and the thickness of the backing may vary from one piece of carpet to the next depending on the carpet design and construction. Thus, when "splitting or "shaving" the face yarn from the carpet. the position of the rollers relative to the splitting blade is adjusted appropriately such that that the maximum amount of face yarn is removed without shaving any of the carpet backing.

The shaved and separated face yarn is then cleaned prior to re-extrusion back into fiber. The preferred method involves the initial use of mechanical screening devices. Size reduction of the separated face yarn is beneficial in subsequent removal of contaminants; mechanical agitation of the face yarn during the size reduction process dislodges the contaminants from the face yarn thereby assisting in their removal. The size reduction process also opens up twisted, cabled or barber-pole yarn allowing contaminants that might be trapped within the twisted yarn structure to be released. A high speed, low intensity grinder is preferred so that frictional heat in the size reduction process is minimized so that the polymer is not significantly subjected to mechanical or thermal degradation. The grinder is fitted with a screen of hole size between $\frac{1}{8}$ inch to $\frac{3}{4}$ inch and preferably $\frac{3}{16}$ inch to $\frac{7}{16}$ inch.

The size reduced face yarn is fed via a cyclone to a mechanical screening device. Airborne dust can be removed from the feed stream during this conveyance process by the cyclone. The preferred screener types are those most suitable for handling light or bulky materials such as, but not limited to, revolving screens, reciprocating screens, gyratory-reciprocating screens. Vibrating screens may also be used. A further option is a modification of the revolving screen type where the screen is stationary and the material is fed through a perforated cylindrical screen via a rotating auger. A screen opening or hole size of a minimum dimension of $\frac{1}{8}$ inch to $\frac{3}{4}$ inch and preferably $\frac{3}{16}$ inch to $\frac{7}{16}$ inch. The choice of hole dimensions is determined by the hole size on the grinder screen. The contaminants are removed through the holes in the screen. The screened face yarn is discharged from the end of the cylinder. Reduced pressure flow or vacuum can be applied to the outside of the screen to improve the efficiency of removal of the contaminants from the face yarn.

The mechanically screened face yarn is now preferably cleaned or scoured further by an aqueous separation method or washing process. The face yarn is preferably washed at high temperature with or without surfactants. If surfactants are used, anionic-based surfactants are preferred. A high pH condition in an oxidative reducing environment may also be used, however the conditions used should not be such that the face yarn is substantially degraded during the washing process. The high pH condition can be achieved by addition of an alkali, including but not limited to, sodium hydroxide, potassium hydroxide, ammonium hydroxide, sodium or potassium carbonate, or trisodium phosphate, or mixtures thereof. The optional use of a bleaching environment can be achieved for example by addition of thiourea dioxide. Oxidative bleaching conditions can be achieved through use of hypochlorites, hydrogen peroxide or sodium chlorite. Commercial laundering equipment can be used for this scouring purpose. Another non-limiting option is use of a pressurized vessel so that the temperature may be increased above the boil for improved cleaning efficiency and reduced washing times. If a high pH condition is used neutralization of the wash liquor and race of the face yarn prior to drying is preferable. This washing process may also be carried out prior to the grinding and mechanical screening if so desired.

The substantially contaminant-free face yarn can either be converted into a granule or pellet form. Granule formation processes include, but are not limited to, use of a Netzsch- Condux Plastocompactor or a California Pellet Mill, melt extrusion, or a combination thereof. Pellet formation processes include melt extrusion processes which involve feeding the material into a melt compounding extruder, using ram or cramming devices as appropriate to improve feeding efficiency, filtering the molten material using an in-line filtration system, followed by formation of strands which are cooled and then pelletized. Underwater pelletizers for certain polymer types can also be successfully used removing the need for stranding the reclaimed material. The reclaimed material can then be used to prepare further synthetic fibers for use in both textile and flooring applications.

The fiber extrusion ready reclaimed material was analyzed by carrying out a melt filtration test on a pilot-scale single screw melt extruder fiber spinning line. A filter screen pack consisting an 80×700 Dutch twill weave screen and coarser mesh supporting screens was placed above the fiber spinneret. The 80×700 Dutch twill weave screen had a nominal retention of 25 microns with an absolute retention of 34 to 36 microns; (Ref: Woven Wire Cloth Reference Book, Haven & Boecker, 1990). A pressure transducer was cited above the screen pack. Blends of reclaim at various percentages in virgin PA66 with an RV=3.1 were prepared and tested using this set up and the pressure monitored.

EXAMPLE 1

Non-Inventive

A commercial reclaim post industrial melt extrusion line was purged with virgin nylon 6 resin. Nylon 66 carpet face yarn that had been shaved off post consumer carpet using a hide splitting machine was fed via a conveyor to the feed throat of a single screw extruder at a nominal 500 lbs/hour. The nylon melt was in-line filtered through a screen pack consisting a 325 square mesh screen with coarser mesh supporting mesh screens. The 325 square mesh screen had an opening size of 43 microns. The in-line filter was of the manual filter screen change type. Pressure rise on the filter was very rapid such that the pressure exceeded the operational limits of the filter before the reclaim material had fully purged out the virgin nylon 6. The extrusion line was purged with further nylon 6 resin and a coarser screen pack consisting 80 square mesh with coarser supporting screens was installed into the in-line filter. The 80 square mesh filter screen had an opening size of 180 microns. The nylon 66 carpet face yarn was again fed to the extruder. The operational limits of the in-line filter were again exceeded before the nylon 6 resin was purged out of the extruder. The extruder was purged with virgin nylon 6 and a yet coarser screen pack consisting 3×20 square mesh screens was installed in the in-line filter. The 20 square mesh filter had an opening size of between 860 and 910 microns. The nylon 66 face yarn was yet again fed to the extruder. The pressure rise rate on the filter was approximately 0.03 psi/gram.

EXAMPLE 2

Non-Inventive

The pelletized product of Example 1 was blended with virgin PA66 of an RV=3.1 in a ratio of 25% of to 75% by weight and dried to 500 ppm moisture. The pellet blend was further processed on a single screw melt compounding extruder fitted with an in-line automatic filter screen changer. The filter aperture size was 75 microns. The filtered melt was stranded and pelletized. The level of the contaminants was such that filter aperture sizes smaller than 75 microns could not be used without exceeding the operational limitations of the machine.

EXAMPLE 3

Invention

Nylon 66 carpet face yarn that had been shaved off post consumer carpet in a similar manner to Example 1 was size reduced in a Cumberland granulator fitted with a 5/16" mesh screen. The size reduced material was conveyed to a cyclone. The face yarn was then fed via a rotating valve to a screener consisting a rotating auger inside a perforated cylindrical screen. Contaminants were removed through the screen under reduced pressure and the face yarn was conveyed by the auger through a second rotating valve and collected. The collected face yarn was densified using a Condux Plastocompactor. The densified face yarn was blended with virgin nylon 66 on a production fiber spinning line in a 5:95 ratio. An in-line filter was used containing a filter screen pack similar to that used in the melt filter test. A filter life of about 5 hours was obtained.

EXAMPLE 4

Invention

Nylon 66 carpet face yarn that had been shaved off post consumer carpet in a similar manner to Example 1 was size reduced in a Cumberland granulator fitted with a 5/16" mesh screen. The yarn was further processed in a similar manner to Example 3 except the face yarn throughput was reduced and a higher vacuum was used to remove contaminants from the screener.

EXAMPLE 5

Invention

Nylon 66 carpet face yarn was shaved off post consumer carpet, sized reduced and mechanically screened in a similar manner to Example 3. The yarn was then washed in a commercial washing machine with Tide® laundry detergent (registered trademark of Proctor and Gamble) and Clorox® bleach (registered trademark of Clorox Chemical Company). The cleaned yarn was tested using the melt filter test. The pressure rise was significantly less than Examples 3 and 4 showing the additional benefit of an aqueous washing process on the effectiveness of contaminant removal.

The pelletized material of Examples 1 and 2, the densified reclaim of Examples 3 and 4, and the decontaminated face yarn of Example 5 were blended with virgin PA66 in the weight percentages shown in Table 1 and evaluated using the melt filter test described above. The results are shown in Table 1. The reclaimed material from Examples 3, 4 and 5 gave significantly lower filter pressure rise than Examples 1 and 2 indicating that removal of contaminants in the carpet face yarn was effective in producing a product that can be spun into carpet fiber.

EXAMPLE 6

Invention

Nylon 66 carpet face yarn was shaved off post consumer carpet, sized reduced and mechanically screened in a similar manner to Example 3. The mechanically screened yarn was densified using a California Pellet Mill. The densified material was fed to a twin screw melt extruder fitted with an in-line melt filtration system. The melt was filtered through a 60 mesh screen and pelletized. The pelletized material was subjected to the melt filter test. The results are shown in table 1.

TABLE 1

| Source of reclaimed face yarn resin, Example No. | % Reclaimed face yarn in virgin PA66 | Pressure Rise/psi/gram |
|---|---|---|
| 1 | 5% | 3.20 |
| 2 | 5% | 1.10 |
| 3 | 2% | 0.60 |
| 3 | 10% | 1.10 |
| 4 | 2% | 0.08 |
| 5 | 2% | 0.05 |
| 6 | 5% | 0.09 |

We claim:

1. A process for producing a synthetic fiber composition, comprising
   i. shaving face yarn from post consumer carpet by use of a shaving device to provide a shaved face yarn;
   ii. reducing the sizes of said shaved face yarn;
   iii. agitating said shaved face yarn;
   iv. removing contaminants from said shaved face yarn by mechanical screening, washing, or a combination thereof; and
   v. melt filtering of said shaved face yarn to produce a recycled fiber-forming thermoplastic resin; and
   vi. blending at least 2 weight percent of said recycled fiber-forming thermoplastic resin with a virgin fiber-forming resin to form a fiber-forming blend,
   wherein
      said fiber-forming blend provides a pressure rise of 0.6 psi/gm or less when said blend (i) contains 2 weight percent of said recycled fiber-forming thermoplastic resin and (ii) is subjected to a melt filter test using a Dutch twilled weave filter screen of 80×700 nominal mesh count using a pilot-scale single screw extruder.

2. The process according to claim 1, wherein said post consumer carpet face yarn comprises nylon 6, nylon 66, polyethylene terephthalate, polytrimethylene terephthalate, polylactic acid, or polypropylene.

3. The process according to claim 1, wherein said virgin fiber-forming thermoplastic resin comprises nylon 6, nylon 66, polyethylene terephthalate, polytrimethylene terephthalate, polylactic acid, or polypropylene.

4. The process according to claim 1, wherein said post consumer carpet face yarn comprises nylon 6, nylon 66, polyethylene terephthalate, polytrimethylene terephthalate, polylactic acid, or polypropylene; and said virgin fiber-forming thermoplastic resin comprises nylon 6, nylon 66, polyethylene terephthalate, polytrimethylene terephthalate, polylactic acid, or polypropylene.

5. The process according to claim 1, wherein said fiber-forming blend provides a pressure rise of less than 1.10 psi/gm when said blend (i) contains 5 wt % of said recycled fiber-forming thermoplastic resin and (ii) is subjected to a melt filter test using a Dutch twilled weave filter screen of 80×700 nominal mesh count using a pilot-scale single screw extruder.

6. The process according to claim 1, wherein said fiber-forming blend comprises at least 5 wt % of said recycled fiber-forming thermoplastic resin.

7. The process according to claim 1, wherein said fiber-forming blend comprises about 2 to about 10 weight percent of said recycled fiber-forming thermoplastic resin.

8. The process according to claim 1, wherein said shaved face yarn contains less than 2 weight percent carpet backing material.

9. The process according to claim 1, wherein said shaved face yarn contains less than 0.5 weight percent carpet backing material.

10. The process according to claim 1, wherein said post-consumer carpet face yarn comprises polyethylene terephthalate, polylactic acid, nylon 6, or nylon 66.

11. The process according to claim 1, wherein said post-consumer carpet face yarn comprises nylon 6 or nylon 66 and said virgin thermoplastic resin comprises nylon 6 or nylon 66.

12. The process according to claim 1, wherein said synthetic fiber composition consists essentially of said fiber-forming blend.

13. The process according to claim 1, wherein said synthetic fiber composition consists of said fiber-forming blend.

14. The process according to claim 1 wherein said contaminant removal step (iv) comprises mechanical screening and washing.

15. The process according to claim 1, wherein said shaving device is a hide splitting machine.

16. The process according to claim 1, wherein said mechanical screener is selected from the group consisting of stationary screens with rotating augers, reciprocating screens, gyratory-reciprocating screens and vibrating screens.

17. The process according to claim 1, wherein step (ii) comprises grinding said shaved face yarn.

18. A process for producing a synthetic fiber composition, comprising
   i. shaving face yarn comprising polyethylene terephthalate, nylon 6, or nylon 66, from post consumer carpet by use of a shaving device to provide a shaved face yarn;
   ii. reducing the sizes of said shaved face yarn;
   iii. agitating said shaved face yarn;
   iv. removing contaminants from said shaved face yarn by mechanical screening and washing;
   v. melt filtering of said shaved face yarn to produce a recycled fiber-forming thermoplastic resin; and
   vi. blending at least 2 weight percent of said recycled fiber-forming thermoplastic resin with a virgin fiber-forming resin comprising polyethylene terephthalate, nylon 6, or nylon 66 to form a fiber-forming blend,
   wherein
      said fiber-forming blend provides a pressure rise of 1.10 psi/gm or less when said blend (i) contains 5 weight percent of said recycled fiber-forming thermoplastic resin and (ii) is subjected to a melt filter test using a Dutch twilled weave filter screen of 80×700 nominal mesh count using a pilot-scale single screw extruder.

19. The process according to claim 18, wherein said fiber-forming blend comprises at least 5 wt % of said recycled fiber-forming resin.

20. The process according to claim 18, wherein step (iv) further comprises washing said shaved face yarn with a surfactant.

* * * * *